Figure 1:
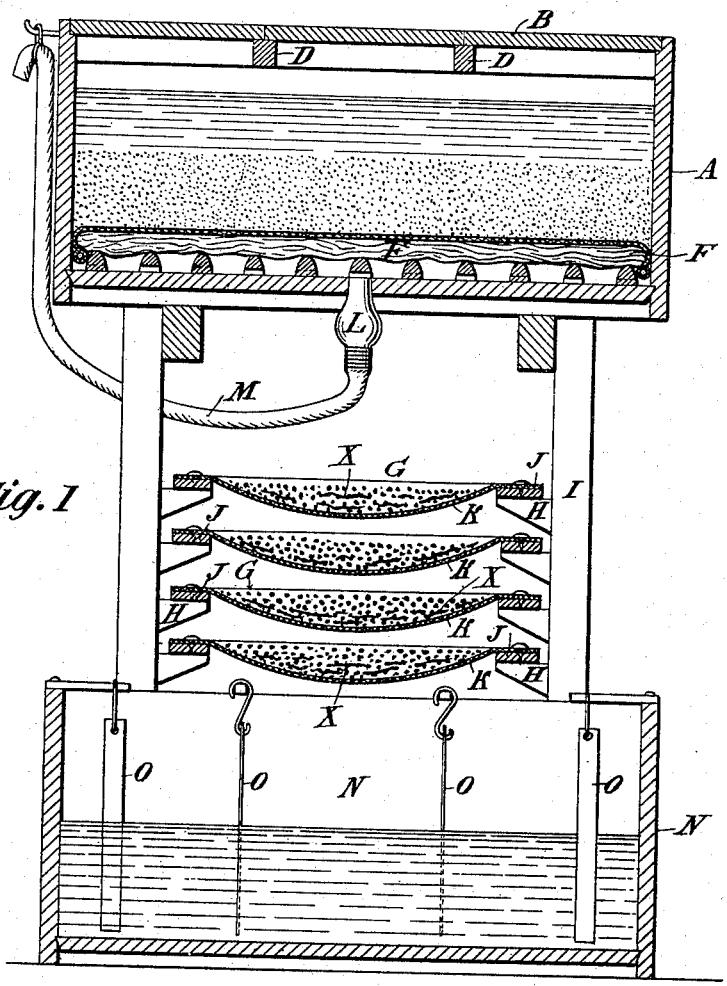

(No Model.)

J. J. CROOKE.
PROCESS OF TREATING COPPER SULFIDS.

No. 589,959. Patented Sept. 14, 1897.

Witnesses:
Raphael Netter
James N. Catlow

Inventor
John J. Crooke
by
Duncan & Page
Att'ys

UNITED STATES PATENT OFFICE.

JOHN J. CROOKE, OF NEW YORK, N. Y.

PROCESS OF TREATING COPPER SULFIDS.

SPECIFICATION forming part of Letters Patent No. 589,959, dated September 14, 1897.

Application filed August 7, 1895. Serial No. 558,502. (No specimens.)

*To all whom it may concern:*

Be it known that I, JOHN J. CROOKE, a citizen of the United States, residing in the city, county, and State of New York, have invented certain new and useful Improvements in Processes of Treating Copper Sulfids, of which the following is a specification, reference being had to the accompanying drawings, forming a part of the same.

The present invention relates to the treatment of mattes of copper-sulfid ores (hereinafter called "copper sulfids") for the extraction of the copper therefrom as well as the recovery of any silver or gold contained therein. Ores of this class and the mattes formed therefrom almost always carry a large proportion of iron sulfids and variable proportions of compounds of arsenic, antimony, or bismuth, generally in the condition of sulfids, which heretofore have been regarded as noxious elements or compounds in that they interfere with the extraction of the copper, as well as the silver and gold, if present, and have compelled the employment of processes and manipulations which are complicated, prolonged, and expensive. The expense attending these processes, together with the decline in the market price of copper during the past few years, has resulted largely in the discontinuance of the working of copper sulfids unless they carried considerable value in silver or gold or other products which could be recovered and would contribute to pay the cost of working the copper sulfids. In brief, the copper extracted from these ores and mattes, when considered by itself, has come to be regarded as a by-product, inasmuch as they could not be worked at a profit did they not yield other valuable elements.

The object of the present invention is to provide a simple, speedy, and economical method of working copper sulfids, whether they carry silver or gold or not, and obtaining therefrom metallic copper of greater purity than has been practicable by the processes heretofore employed; also of recovering the silver and gold associated with such copper sulfids without materially increasing the cost of the process or method.

To this end the present invention consists, generally stated, in roasting the pulverized copper sulfids and associated elements or compounds with sodium chlorid or common salt, leaching the roasted mass with an oxidizing solution, preferably composed of sodium chlorid acidulated with sulfuric acid and containing a small percentage of copper nitrate, the latter preferably carrying a very small percentage of free nitric acid, whereby the iron sulfids are largely oxidized and the noxious elements or compounds—as arsenic, antimony, and bismuth—are dissolved by and removed with the solution, and the silver and gold, if present, are converted into soluble chlorids, in which condition they can be readily recovered, and then extracting the copper from the residuum or tailings by any process or method adapted thereto, but preferably by the method hereinafter fully described and claimed.

Although copper sulfids generally carry sufficient silver or gold to warrant the recovery of these metals, yet there exist large bodies of ores of this class which carry substantially no gold or silver, but are sufficiently rich in copper to be worked profitably, and it is to this class of ores, as well as to those carrying silver and gold, that the present process is applicable. Inasmuch, however, as the essential steps of the process are substantially the same when silver and gold are present as when they are absent, the following description will include the treatment of copper sulfids containing silver and gold and the recovery of these metals, and afterward certain slight changes or modifications in the process to better adapt it for the treatment of copper sulfids containing no silver or gold will be pointed out.

In carrying this invention into effect the copper-sulfid ores are preferably first concentrated into a matte or regulus by any of the well-known operations of calcination, fusion, or slagging, such concentration being preferably continued till the matte contains from forty to sixty percentum of copper. The silver and gold, if present, will be correspondingly concentrated, and the iron and other diverse elements and compounds will also be concentrated in the formation of the mattes, but generally to a less extent. These mattes are pulverized, preferably, to about forty or fifty mesh and are mixed with from four to fifteen percentum of sodium chlorid, the proportion depending largely upon the character of the mattes and especially upon the amount of silver contained therein. If there is little or no silver present, four or five percentum of sodium chlorid will be sufficient to effect the desired results, but the percentage of sodium chlorid should be increased with the increase of the silver, ten percentum being generally sufficient, provided the material or stock carries not more than two or three hundred ounces of silver to the ton. If, as is sometimes the case, eight or nine hundred ounces of silver to the ton are present, the proportion of sodium chlorid used should be somewhat increased.

The material or stock prepared substantially as above set forth is then subjected to a light or low roast (preferably in a reverberatory furnace) for about twenty-five minutes, care being observed, especially if silver or gold is to be recovered, to maintain the charge below a prolonged red heat, which temperature precludes the loss of either of these metals by volatilization. The sole of the furnace may be kept at a red heat, but as soon as the top of the charge shows a decided redness the charge should be drawn and dumped on the cooling-floor. The charge should be actively stirred or rabbled during the roasting stage. The object of this low roast or heating step is to bring the various elements or compounds of the mass into a condition to be properly affected by the leaching or lixiviating step which immediately follows. The sulfid of silver is converted into a subsulfid, sodium sulfid and sulfate being formed. The compounds of arsenic, antimony, and bismuth are probably partially chloruated, and the iron sulfids are brought into condition to be readily oxidized by the subsequent solution or leaching treatment.

Copper sulfids, by reason of the great affinity of sulfur for copper, are the most stable of the sulfids, far more so than silver or iron sulfids, and it follows that when the sulfids of these metals are subjected to a low roast the sulfids of silver and iron are partially decomposed and are brought into condition for rapid and more complete decomposition when subjected to the leaching operation, hereinafter more fully described, while the copper sulfids are untouched or but slightly affected. So, also, during the leaching step of the process the liberated oxygen will act to decompose the less stable compounds before it affects the copper sulfids, and unless there is an excess of oxygen present or liberated the copper sulfids will be only slightly decomposed during the leaching operation.

When the charge, after being drawn from the furnace, has cooled down, preferably to about 300° Fahrenheit, it is placed in a suitable vessel or tank and subjected to a leaching or lixiviating step or operation, preferably by a solution substantially of the character hereinafter immediately and fully described, for the purpose of converting the silver and gold into soluble chlorids and freeing the copper sulfids of interfering elements and compounds, and especially for converting a large proportion of the iron to an oxid, in which condition it is utilized in the subsequent step or process of converting the copper sulfids into metallic copper.

The leaching or lixiviating solution referred to above consists of sodium chlorid dissolved in water preferably to, or near to, saturation, and brought to a decided acid reaction with sulfuric acid, as indicated by a pronounced redness given to blue litmus, about ten pounds of commercial sulfuric acid to one thousand gallons of the solution being sufficient. To each one thousand gallons of this acidified sodium-chlorid solution, called the "main solution," there is added about ten pounds of a solution, called the "subsolution," of copper nitrate diluted with water to indicate about 100° by the ordinary salometer or about 25° by Baumé's hydrometer.

It is preferred, for the purpose of inciting and giving increased rapidity to the desired reactions, as well as aiding the efficiency of the solution, that the copper nitrate of this subsolution shall carry a small percentage of free nitric acid, from one-fourth to one-half of one per cent. of the undiluted copper nitrate being generally sufficient. If the copper nitrate is prepared in the usual manner, by exposing metallic copper to the action of nitric acid of about 1.42 gravity at a temperature not to exceed from 60° to 80° Fahrenheit, about the desired quantity of free nitric acid will be associated with and carried by the nitrate of copper, but if the temperature is much increased above 80° Fahrenheit the free nitric acid will be largely eliminated, and in such case it is preferred to add sufficient free acid to bring its percentage up to about the point above stated. As above indicated, about ten pounds of this subsolution is added to one thousand gallons of the main solution, it being understood, however, that these proportions may be varied to meet the varying conditions of the charge, particularly the percentage of silver contained therein.

If the charge carries not more than one hundred ounces of silver per ton, the proportions named will insure the exhaustive extraction of the silver, as well as the small percentage of gold usually present, and will coöperate with the other ingredients of the solution to bring the diverse compounds associated with the copper sulfids into the desired condition for their elimination from or subsequent treatment with the copper sulfids. When these main and sub solutions have been intimately mingled, they form the leaching or lixiviating fluid or solution, which is preferably raised to a temperature of about 150° Fahrenheit and is delivered upon the charge, which has already been placed in any suitable constructed tank or vessel in which the leaching can be properly carried on.

It is preferred, in order to convert the silver and gold, as well as the noxious elements and compounds, into soluble chlorids, so that they can be separated and eliminated from the copper sulfids, and also to oxidize the iron sulfids, that the quantity of the solution delivered upon the charge shall be about equal in weight to the weight of the charge itself. As before stated, the temperature of the charge is preferably about 300° Fahrenheit when placed in the leaching-tank and the temperature of the solution about 150°, which would give a mean temperature of 225°, which will be somewhat increased by the subsequent chemical reactions. After the solution has been laundered upon the charge the vessel should be tightly closed and kept in that condition for about one hour before the solution is drawn off. The tank should be provided with a filter-bottom to prevent any solid matter from passing off with the solution.

It is not absolutely essential that the main and sub solutions should be separately prepared and then mingled together, but the leaching solution may be made by mixing all the ingredients in the same vessel at the same time.

It is difficult to state fully and accurately just what reactions take place during this leaching step, but undoubtedly the copper nitrate, aided by hydrochloric acid formed by the action of sulfuric acid upon the sodium chlorid, attacks with avidity the various subsulfids with the liberation of free sulfur and sulfuric acid, which latter is in a nascent condition and attacks with great power the subsulfids and sodium chlorid to generate fresh supplies of hydrochloric acid. The silver subsulfid is probably first converted into sulfate and by the action of the liberated hydrochloric acid is then converted into silver chlorid, which is dissolved as rapidly as formed by the hot sodium-chlorid solution, forming a double chlorid of sodium and silver. Gold, if present, as well as the noxious or interfering elements and compounds referred to, are also converted into soluble chlorids and pass the filter with the solution.

The copper nitrate is regarded as an important and efficient agent in effecting this interchange of elements. It carries a large percentage of peroxid of nitrogen, which probably unites with hydrochloric acid to form nitrohydrochloric acid, which is decomposed with the liberation of many equivalents of oxygen to aid in converting the iron into oxids and to produce other desirable reactions and compounds. If the nitrate of copper is acidified with free nitric acid, (as hereinbefore stated is its preferred condition,) it acts more quickly to produce the desired reactions and considerably less time will be required for perfecting the leaching or lixiviating operation. The copper of the nitrate, together with a very small percentage of the copper contained in the copper sulfids, is changed into a chlorid and is dissolved by the solution and carried through the filter with it. During this leaching operation the copper sulfids have parted with a small percentage of their sulfur, and a very small percentage of their copper has probably been converted into chlorid. The iron sulfids have been largely converted into oxids, and the interfering elements or compounds—like arsenic, antimony, and bismuth—have also been converted into chlorids and have been dissolved in and carried off by the solution together with the silver and gold and have thus been separated from the copper sulfids and iron oxids. The copper sulfids and iron oxids are insoluble in and do not pass the filter with the solution, but constitute the tailings or residuum and contain almost the entire percentage of copper originally in the stock, two percentum, perhaps, of the copper having been converted into chlorid and passed the filter with the solution.

The silver, gold, and copper dissolved in the solution as chlorids are carried from the leaching-tank with the solution and can be readily recovered by any of the well-known methods, but preferably, to recover the silver, by bringing the solution in contact with metallic copper, (preferably in the state of cement,) whereby the silver will replace the copper. The gold can be deposited upon strips of metallic iron placed on top of the cement copper on which the silver is deposited. The copper, whether derived from the nitrate or the copper sulfids or the cement copper replaced by the silver, can be deposited upon plates of soft iron conveniently placed in a vessel, which receives the solution after the silver and gold have been recovered.

Although it is not desired to limit this invention to the use of any special apparatus or construction of tanks or vessels for effecting the leaching operation or for the recovery of the silver, gold, or copper from the solution a form of apparatus especially adapted for these purposes is illustrated in the accompanying drawings, in which—

Figure 2:
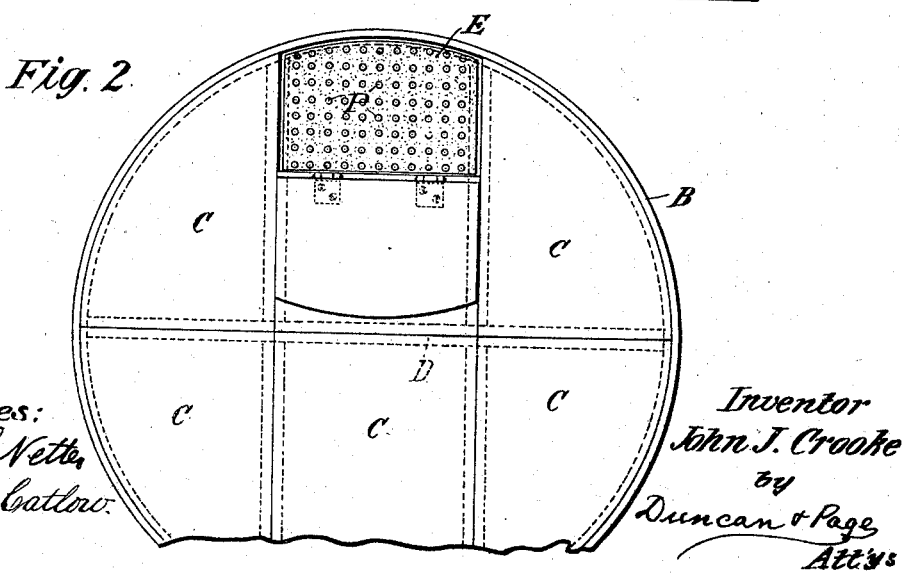

Figure 1 is a central sectional view, and Fig. 2 is a plan view.

In the drawings, A represents a cylindrical tank, preferably constructed of wood, about fourteen feet in diameter and six feet high, having a capacity of about fifteen tons of stock to be treated and an equal weight of leaching solution. This tank is provided with a cover or top B, preferably made in sections, as C, with close-fitting joints and supported upon the rim of the tank and cross-pieces D. A hole E is formed in the cover, into which the stock can be dumped from cars trammed alongside.

F is a filter near the bottom of the tank of any suitable construction.

G are holders for containing metallic or cement copper arranged one above the other and preferably beneath the tank A and supported on brackets H, attached to a rack I. These holders are conveniently made of frames J and stout canvas K, secured at their edges or margins to the frames J, and furnish receptacles to contain the copper cement and strips of iron, if desired. These holders can be easily slid into position on their brackets and be readily removed for taking off the silver and gold and for cleaning and recharging. About forty pounds of cement copper should be loaded upon each holder and the charge should be renewed as frequently as the richness of the ores in silver require. The larger proportion of the silver and gold in the solution will be deposited upon the upper holder of the series, which may at any time be removed and the next lower holder be substituted for it, the remaining holders being at the same time moved up one step on the rack, the holders being kept in position until the deposit of the silver and gold is sufficiently thick to be removed as a coherent sheet of nearly pure metal, which can be melted down and cast into bars or treated in any other desired manner.

L is the exit of the leaching-tank, to which there is preferably attached a flexible hose M as a convenient means for opening and closing the exit and conveying the solution to the desired location.

N is a tank preferably located below the series of holders on which the silver and gold is deposited and is supplied with metallic iron for the recovery of copper contained in the solution. It is preferred to use for this purpose thin sheets O of soft iron held upright in the tank N. About fifty pounds of such iron may properly be placed in the tank and may be used until the copper in the solution has replaced the iron.

After the charge of, say, fifteen tons of the pulverized mattes roasted with sodium chlorid, as above described, has been dumped into the tank A it should be carefully leveled off, and the solution should be laundered upon its surface, so as to completely and uniformly cover it. To effect this and prevent the solution from forming channels in the charge, it is preferred to gradually launder the solution upon a perforated diaphragm P, temporarily placed over the dump-hole, which will divide the solution into small streams and cause it to flow evenly over the surface of the charge. As soon as the solution is in place the covers should be closed tightly to preserve the temperature of the charge, and as an additional protection a flexible covering of cloth preferably soaked with paraffin may be placed over the tank. It is preferred that the charge should remain in a state of perfect repose for about an hour after the solution is laundered upon it in order that the solution may gradually and uniformly pass through and completely saturate every part of it. At the end of this time the hose M is lowered, and the solution is discharged upon the upper holder of the series, containing cement copper and a few strips of metallic iron x, if the gold is present in the solution, the filtrate passing through the series of holders and delivered into the receiving-tank N beneath. All the silver and gold will be deposited upon the cement copper and on the iron on the holders G in a metallic condition and will form upon the upper holder a sufficiently thick and coherent coating to permit it to be readily rolled off from the copper. The copper from the decomposed nitrate and a small percentage from the decomposed sulfids of the charge, as well as that which has been replaced by the silver upon the holders G, is delivered with the solution into the receiving-tank N, where it is deposited upon the soft-iron plates O contained therein and from which it is removed as cement copper and is in condition for reuse in making additional nitrate of copper or to be placed upon the holders G, or it may be oxidized and utilized in the subsequent operation of extracting metallic copper from the tailings, as hereinafter referred to.

Under ordinary conditions the efficiency of this solution, with additions of copper nitrate and sulfuric acid, will be maintained for use in repeating the operation above described many times. It is, however, true that gradually the solution will become loaded with sulfate of soda, salts of iron, and compounds of arsenic, antimony, and other noxious compounds derived from the charge, and in such cases it can be readily freed of these salts and compounds by any of the well-known operations of precipitation. For example, the iron salts may be precipitated by caustic lime, which will also precipitate the compounds of arsenic, antimony, and many of the other noxious compounds. The sulfate of soda may be precipitated by the introduction of calcium chlorid. The solution should be kept up to its normal strength and efficiency by the introduction of sulfuric acid from time to time, and it is preferred that sodium chlorid should be also introduced to keep the solution in a state of saturation. It will be also essential to introduce new charges of the copper-nitrate solution and free nitric acid, if desired, as often as the solution is reused.

As has been hereinbefore stated, the essential steps for treating copper sulfids will remain substantially as above described even if no silver or gold is present. Slight modifications in the percentages of sodium chlorid in the roast and of the copper nitrate in the solution may be made to advantage to cheapen the cost of the process. For example, if no silver is present four per centum of sodium chlorid in the roast will generally be found sufficient, and the quantity of the subsolution of copper nitrate can generally be reduced from ten to five pounds to one thousand gallons of the main solution. If, however, the stock contains an unusually large proportion of iron sulfids or of noxious compounds, it is safe to use the same proportions of sodium chlorid and copper nitrate as when the stock carries about one hundred ounces of silver to the ton. The gold is generally present in such small quantity that little change in proportions need be made for its conversion. Of course if no silver or gold is present the series of holders for carrying cement copper and metallic iron (shown in the accompanying drawings) can be omitted or removed.

It will be understood that the two steps or operations which have been fully described are effective not only for converting the silver and gold, if present, into soluble chlorids, whereby they are readily recovered from the solution, but also and especially for freeing the copper sulfids of noxious elements or compounds which interfere with the extraction of the copper in a metallic condition by subsequent operations, as well as for largely converting the iron sulfids into iron oxids intimately mingled in a finely-divided condition with the copper sulfids, in which condition they render important service in the extraction of the copper, as hereinafter more fully set forth.

The copper sulfids and iron oxids are insoluble in the solution and do not pass the filter of the leaching-tank, but constitute the tailings or residuum carrying almost the entire percentage of copper originally contained in the mattes, which may be converted into and extracted as metallic copper by any of the well-known methods—as, for instance, by the Bessemer process—or any of the usual processes of roasting and smelting.

For simplicity and economy, as well as to obtain the metallic copper in a state of greater purity than by any of the usual methods, the following-described process of treating the tailings is preferred, viz: The residuum or tailings, composed mainly of copper sulfids and iron oxids generally carrying considerable free sulfur, are removed from the leaching vessel and subjected to a low roast, provided they still carry an excess of sulfur, which makes this necessary or expedient before they are subjected to a subsequent smelting operation. To effect this roast, they are placed upon a moderately-heated sole of a common roasting-furnace, the heat being sufficient to fire the free sulfur, which will raise the temperature sufficiently to decompose and eliminate a portion of the sulfur of the sulfids. This operation is preferably continued for about fifty minutes, the charge being actively rabbled and the heat kept low enough to prevent the formation of sulfates and oxids of copper. When the charge is drawn from the roasting-furnace, it consists, mainly, of copper subsulfids and iron oxids and is then intimately mixed with about three per centum of pulverized carbon and about ten per centum of silica or common sand. It is then charged into a suitable melting-furnace (preferably of the reverberatory type) and is gradually melted down with the usual manipulations to form "blister-copper." During this smelting operation the carbon, in a finely-divided condition and gradually brought to a red heat, acts upon the oxid of iron (which has also been brought into a finely-divided condition by the leaching operation) to deoxidize and reduce it to metallic iron, in which condition it remains so long as only a moderate red heat is maintained. This metallic iron is disseminated through the charge in fine porous particles analogous to sponge platinum and is in a proper condition to combine with the sulfur of the copper sulfids as they are decomposed. As the temperature of the furnace is increased the sulfur leaves the copper sulfids, liberating metallic copper, and unites with the metallic iron to form subsulfid of iron, which in turn becomes decomposed in the presence of oxygen and silica to form sulfurous and sulfuric acid and silicate of iron. The silicate of iron thus formed rises to the surface of the melted charge and forms a clean black slag, which is rabbled off as closely as practicable without removing the melted copper. Immediately upon the removal of this slag about three per centum of silica is thrown upon and stirred into the charge. The heat of the furnace is then considerably raised and this freshly-introduced silica, in conjunction with the remaining portions of the silicate slag not theretofore removed, unites with any remaining oxid of iron, and especially with a small proportion of metallic iron which has become alloyed with the melted copper to form a brownish-red slag on the surface of the charge, which is rabbled off clean, leaving the melted copper substantially free of iron and other impurities. This last slag, which generally contains a small percentage of copper, is broken up and mixed with succeeding charges of tailings, preferably when they are fluxed for smelting.

In case the sulfids carry no silver or gold the first roast, or that which immediately precedes the leaching step, may be continued longer and at a higher temperature than hereinbefore described, with the effect to more thoroughly desulfurize the stock, and under these circumstances it is preferred to roast the stock until it will give a deep blue reaction with aqua-ammonia, and this will generally render the second roast—namely, that of the tailings immediately preceding their fluxing and smelting—unnecessary and will result in a saving of expense. If, however, the stock carries silver and gold, which are to be recovered in the process, the first roast must be carried on at so low a temperature and during so short a time to prevent the volatilization of these metals that only a low desulfurization can be then effected, and consequently it is generally expedient to roast the tailings before they are smelted for the recovery of copper.

Copper sulfid ores and mattes are almost invariably associated with a sufficiently large proportion of iron sulfids to yield, by the leaching operation, the desired proportion of iron oxids to assist in removing a large percentage of the sulfur from the copper sulfids during the smelting of the tailings, as above described. If at any time, however, the proportion of iron oxids in the tailings should be insufficient for this purpose, a small quantity of the cement copper, deposited from the leaching solution and oxidized by raising it to a red heat, can be mixed with the tailings at the time they are fluxed with the carbon and silica, about five per centum of such oxidized copper cement being generally sufficient for this purpose. This oxidized cement will be converted into metallic copper during the smelting operation and be recovered with the main portion of the copper of the charge.

Tailings or residuums containing copper sulfids and iron oxids treated by this method yield blister-copper of extraordinary fineness, and when this blister-copper has passed the refining or ingot furnace and been brought to "tough pitch" by the usual manipulations its purity will be from 99.90 to 99.98 per centum.

Inasmuch as the copper sulfids to which this process is applicable vary materially in their composition, especially in the character and proportions of their associated elements and compounds, it is considered impracticable to formulate definite and exact rules of proportions and treatment best adapted to all the varying conditions which may present themselves. Consequently it is not desired to limit this invention to the use of any special construction of apparatus, furnaces, or tanks, or to the special proportions of the ingredients named, or to the times for performing any step or operation of the process, or to the preferred method or apparatus for recovering silver or gold from the leaching solution, or for extracting metallic copper from the leached tailings, as these do not constitute the essence of the invention, and other means and operations than those hereinbefore specially described may be employed.

The essential and novel features of the invention, briefly and generally stated, consist in roasting the stock with sodium chlorid, leaching the roasted mass with a properly-prepared solution which will convert the iron sulfids into oxids, in which condition they afford a valuable adjunct or assistant in the subsequent extraction of the copper and will also dissolve and remove certain noxious compounds which would interfere with the subsequent extraction of the copper, as well as to dissolve the silver and gold, if present, in a condition in which they can be readily recovered.

What is claimed as new is—

1. The herein-described process of treating copper sulfids associated with iron sulfids, which consists in roasting the pulverized sulfids with sodium chlorid, leaching or lixiviating the roasted mass with an oxidizing solution, whereby the iron sulfids are largely converted into oxids and the copper sulfids are only slightly decomposed, and then subjecting the copper sulfids and iron oxids to a melting or smelting operation to extract the copper in a metallic condition.

2. The herein-described process of treating copper sulfids associated with iron sulfids and noxious or interfering elements or compounds to prepare them for the extraction of metallic copper, which consists in roasting the pulverized sulfids and associated compounds with sodium chlorid, leaching the roasted mass with a hot solution of sodium chlorid, sulfuric acid and copper nitrate, whereby the iron sulfids are largely converted into oxids and provide a valuable adjunct for the conversion of copper sulfids into metallic copper, and the interfering elements or compounds are dissolved by the solution and separated from the insoluble sulfids and iron oxids.

3. The herein-described process of treating copper sulfids associated with iron sulfids, which consists in roasting the pulverized sulfids and associated compounds with sodium chlorid, leaching the roasted mass with a hot solution of sodium chlorid, sulfuric acid and copper nitrate, whereby the iron sulfids are largely converted into oxids and the interfering elements or compounds are dissolved by the solution and separated from the insoluble copper sulfids and iron oxids, and then subjecting the leached copper sulfids and iron oxids to a subsequent smelting operation to extract the copper in a metallic condition.

4. The herein-described process of treating copper sulfids associated with iron sulfids and noxious or interfering elements or compounds to prepare them for the extraction of metallic copper, which consists in roasting the pulverized sulfids and associated compounds with sodium chlorid, leaching the roasted mass with a hot solution of sodium chlorid, sulfuric acid, copper nitrate and free nitric acid, whereby rapid reactions are produced to convert the iron sulfids into oxids and to dissolve the noxious elements or compounds and separate them from the insoluble copper sulfids and iron oxids.

5. The herein-described process of treating copper sulfids associated with iron sulfids and carrying silver or gold, which consists in roasting the pulverized sulfids with sodium chlorid at a low heat, leaching the roasted mass with a hot solution of sodium chlorid, sulfuric acid and copper nitrate, whereby the silver and gold are converted into soluble chlorids and are dissolved in and removed with the solution from which they are easily recovered in a metallic condition, and the iron sulfids are largely converted into oxids to provide a valuable adjunct for the conversion of the copper sulfids into metallic copper by a subsequent operation or process.

6. The herein-described process of treating copper sulfids associated with iron sulfids and carrying silver or gold, which consists in roasting the pulverized sulfids with sodium chlorid at a low heat, leaching the roasted mass with a hot solution of sodium chlorid, sulfuric acid, copper nitrate and free nitric acid, whereby rapid reactions are produced to convert the iron sulfids into oxids for use in the subsequent conversion of the copper sulfids into metallic copper, and the silver and gold into soluble chlorids which are dissolved in and removed with the solution from which they can be readily recovered in a metallic condition.

7. The herein-described process of treating copper sulfids associated with iron sulfids and carrying silver or gold, which consists in roasting the pulverized materials with sodium chlorid at a low heat, leaching the roasted mass with a hot solution of sodium chlorid, sulfuric acid and copper nitrate, whereby the silver and gold are converted into soluble chlorids and are dissolved by and removed with the solution, and the iron sulfids are largely converted into oxids, recovering the silver and gold from the solution, and then subjecting the residuum or tailings of the leaching operation to a subsequent treatment to extract the copper in a metallic condition.

8. The herein-described process of extracting metallic copper from the residuum of tailings of a leaching operation containing copper sulfids and iron oxids, which consists in fluxing the tailings with silica and pulverized carbon, gradually melting the fluxed charge whereby the iron oxids are converted into a metallic condition and the copper sulfids are desulfurized with the liberation of metallic copper and the formation of an iron silicate slag, removing the slag from the melted copper, adding a small per centum of fresh silica to convert any remaining iron oxid, or the metallic iron alloyed with the copper, into an iron silicate slag, and then removing this slag from the copper.

9. The herein-described process of recovering silver or gold and extracting copper in a metallic condition from copper sulfids associated with iron sulfids, which consists in roasting the pulverized sulfids with sodium chlorid at a low heat, leaching the roasted mass with a solution whereby the iron sulfids are largely converted into oxids and the silver and gold are dissolved by and removed with the solution, recovering the silver and gold from the solution, roasting the residuum or tailings, fluxing the roasted tailings with silica and pulverized carbon, gradually melting the roasted and fluxed charge to convert the oxid of iron into metallic iron and desulfurize the copper sulfids to liberate metallic copper and form an iron silicate slag, removing the slag from the melted copper, adding a small per centum of silica to convert any remaining iron oxid or metallic iron into an iron silicate slag and removing this slag from the copper.

JOHN J. CROOKE.

Witnesses:
RAPHAËL NETTES,
JAMES N. CATLOW.